(12) United States Patent
Serban

(10) Patent No.: US 9,538,061 B1
(45) Date of Patent: Jan. 3, 2017

(54) METHOD AND PROGRAM PRODUCT FOR CONTROLLING A REAL TIME FILMING OF A REMOTE LOCATION

(71) Applicant: Alexandru Gheorghe Serban, Tokyo (JP)

(72) Inventor: Alexandru Gheorghe Serban, Tokyo (JP)

( * ) Notice: Subject to any disclaimer, the term of this patent is extended or adjusted under 35 U.S.C. 154(b) by 0 days.

(21) Appl. No.: 14/996,688

(22) Filed: Jan. 15, 2016

(51) Int. Cl.
*H04N 5/232* (2006.01)
*H04N 5/44* (2011.01)
*H04N 7/18* (2006.01)

(52) U.S. Cl.
CPC ...... *H04N 5/23203* (2013.01); *H04N 5/23206* (2013.01); *H04N 5/23216* (2013.01); *H04N 5/23222* (2013.01); *H04N 5/23293* (2013.01); *H04N 7/185* (2013.01); *H04N 2005/4428* (2013.01)

(58) Field of Classification Search
None
See application file for complete search history.

(56) References Cited

U.S. PATENT DOCUMENTS

2014/0046829 A1 2/2014 Serban
2015/0127486 A1 5/2015 Advani

*Primary Examiner* — Mark T Monk
(74) *Attorney, Agent, or Firm* — Ariel Bentolila Bay Area IP

(57) ABSTRACT

A method and program product includes establishing a bi-directional communication channel with an operator's filming system. At least one command is communicated to the operator's filming system. The command at least includes instructions for conducting a filming, wherein the instructions are displayable on the operator's filming system. At least a real time stream of the filming is received. At least additional commands are communicated to the operator's filming system during the receiving, wherein the communicating, the receiving and the communicating during the receiving comprise a negative feedback loop during the filming.

22 Claims, 8 Drawing Sheets

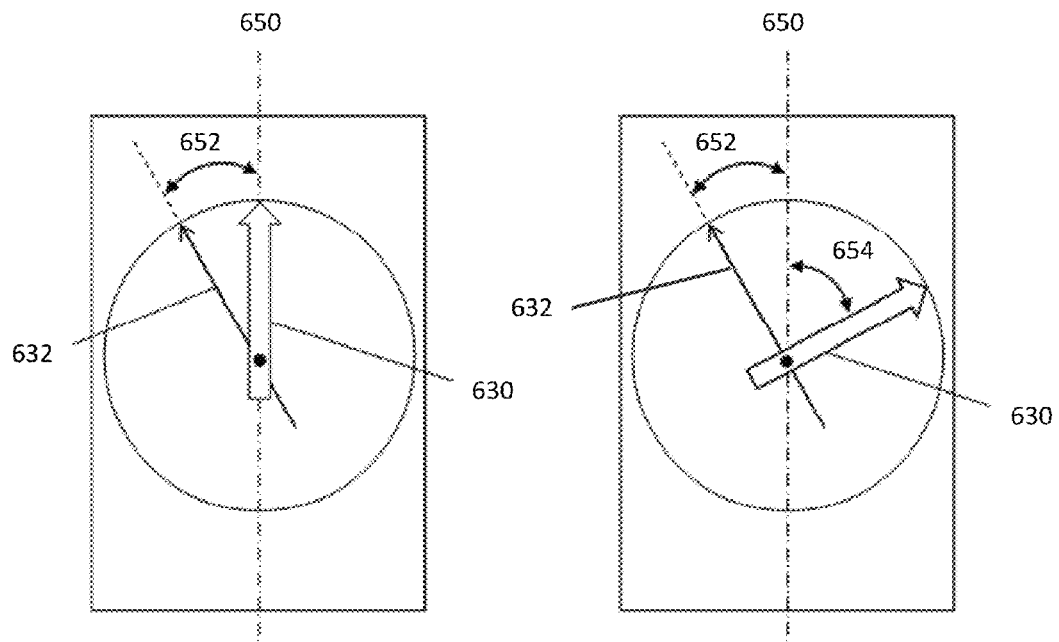
FIG. 6A                    FIG. 6B
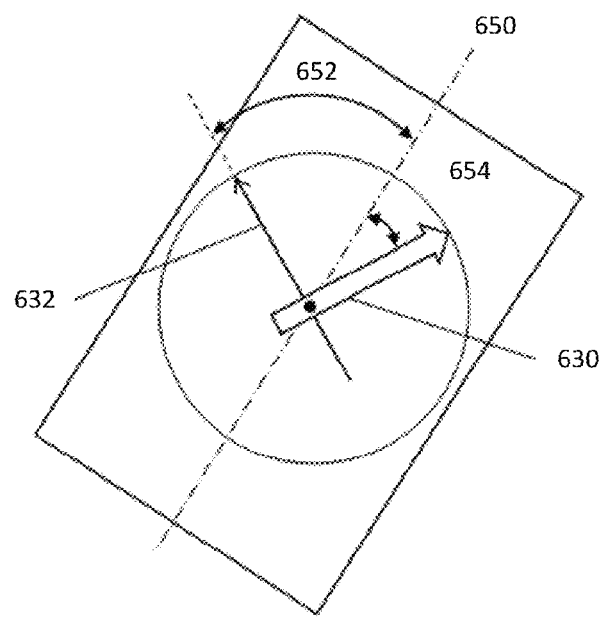
FIG. 6C

705
Client Side Program
707
Receive, decode and display/ play video/ audio;
Display the received control parameters

709
Capture, display and send control information

715
Relay Side Program
717
Receive, process and send data forward

719
Receive, process and send data forward

710
Operator Side Program
712
Display command indicators

714
Capture and encode audio-video data

716
Send (transmit) stream of audio-video data

FIG. 7

METHOD AND PROGRAM PRODUCT FOR CONTROLLING A REAL TIME FILMING OF A REMOTE LOCATION

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a real time filming of a remote location. More particularly, the invention relates to controlling a real time filming of a remote location and viewing using a communication network.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is believed that in many cases people cannot travel to their desired place because of objective reasons such as, without limitation, age, physically impairments, etc. and thus they cannot benefit from a travel experience, especially the enjoyment of sightseeing of the respective place such as tourist spots. To see a certain place one has to either physically visit the place or use pre-recorded films of the respective place. If traveling is not possible, the only way to see the place is by watching pre-recorded films, on a display. However, this alternative doesn't allow a person to view the place neither as desired, nor in real time. One has to see views of the place that have already been filmed, in a way somebody else decided how.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. There are several systems and methods which describe how video data from a filming location is streamed through the internet to a viewing customer, as well as payment methods. However, in these cases, the viewer cannot control the manner in which the shooting is performed by the filming person, information flows into one direction, namely from the shooter to the viewer.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6 A-C illustrate operation of an exemplary negative feedback, in accordance with an embodiment of the present invention;

FIG. 7 illustrates exemplary routines of dedicated programs, in accordance with an embodiment of the present invention.

Figure 1:
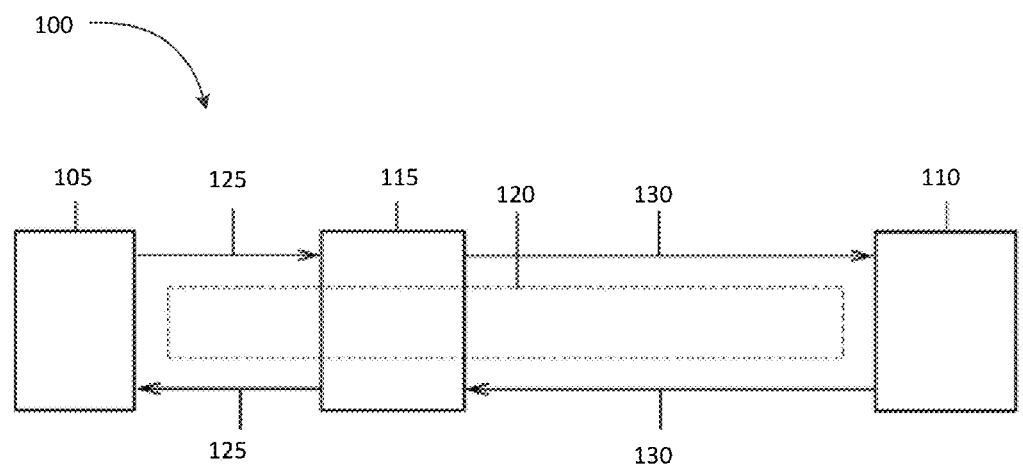
FIG. 1 illustrates an exemplary diagram of a basic system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forward most point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

The functionality and/or the features of a device may be alternatively embodied by one or more other devices which are not explicitly described as having such functionality/features. Thus, other embodiments of the present invention need not include the device itself.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

In many embodiments of the present invention and variations thereof, a system may make it possible for a client to send control information in real time to an operator, so that the filming of a location may be performed in a manner that the client chooses. In the present invention, the client is the person who controls how that filming is performed, and the operator is the person who performs a filming. Many embodiments may have a bi-directional communication between the client and the operator, in other words a loop. In many embodiments, the client may control, in real time, a position such as, but not limited to, pan-tilt-zoom of a camera, as well as a behavior of the operator at the other end of the loop, and so the filming is performed as the client desires at that very moment and the next moment. In some embodiments, the client may control the way the filming may be performed through a negative feedback closed loop by means of a communication channel such as, without limitation, the Internet, established between the client and the operator.

In many embodiments, the result of the filming may be shown on a monitor/display device. The client may see views of the location according to their own will, in real time, as they were at that very place, while physically being at a place of their choice resulting in a truly "virtual trip" experience, without needing to travel physically.

FIG. 1 illustrates an exemplary diagram of a basic system, in accordance with an embodiment of the present invention. System 100 includes a client device 105, an operator device 110, and a relay device 115. In the present embodiment, relay device 115 may establish a bi-directional communication link 120 between client device 105 and operator device 110. Communication link 120 may include a network channel 125 for information exchange with client device 105 and a network channel 130 for information exchange with operator device 110. In non-limiting example, a client, controlling client device 105, may send to an operator, controlling operator device 110, instructions about the way he/she desires filming to be performed. In turn, the operator may comply with those requests and the result of the filming which may be sent back to the client which thus is able to view the scenes in real time and in the manner he desires. In the present embodiment, client device 105 may include computing device such as, but not limited to, desktop computer, laptop computer, tablet, smartphone, etc. with a network connection. Operator device 110 may include a portable computing device with an associated camera such as, but not limited to, a laptop, tablet, smartphone, etc. In a non-limiting example, the camera may be an external one, connected to operator device 110 through Wi-Fi or by cable, or it may be one embedded in the operator device 110. In some embodiments, relay device 115 may be configured as a network server. In some alternate embodiments, relay device 115 may be configured as a network router and/or switch. In some other embodiments, system 100 may not include relay 115 where client device 105 and operator device 110 may communicate directly with each other.

Figure 2:
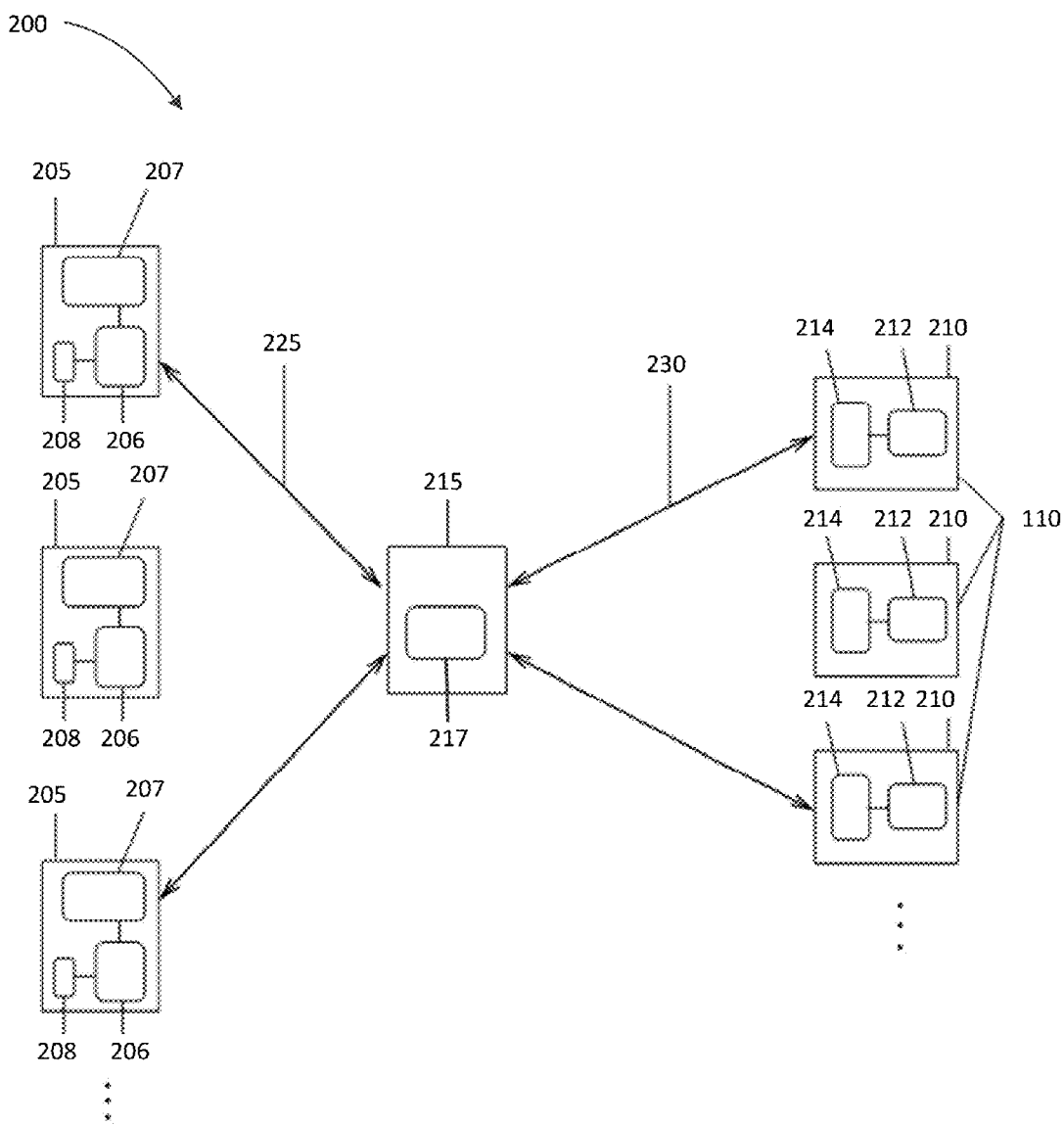
FIG. 2 illustrates an exemplary diagram of a system, in accordance with an embodiment of the present invention.

FIG. 2 illustrates an exemplary diagram of a system, in accordance with an embodiment of the present invention. System 200 may include a plurality of client devices 205, a plurality of operator devices 210, and a relay device 215. In the present embodiment, each client device 205 may communicate with relay device 215 using a network channel 225. Each operator device 210 may communicate with relay device 215 with network channel 230. In the present embodiment, a client controlling one of the client devices 205 may select an operator of one of the operator devices 210 to enter into closed loop through relay 215. An operator device in a closed loop with a client device may not be available for selection by another client. In some embodiments, multiple operator devices may communicate with a single client device.

In the present embodiment, operator devices 210 may include a filming device 212 and a portable computing device 214. Filming device 212 may be a device such as, without limitation, a digital video camera being hand-held, or hanging around the neck, or mounted on the shoulder or hips, etc., an action cam that is small camera that may be operated not necessarily by holding it in hand, for example, without limitation, attaching it with a belt to the shoulder, head, other parts of the body, or attaching it to a helmet or vehicle, camera embedded in portable computing device 214, etc. The audio-video data from filming device 212 may be streamed either wireless or through a physical port, such as, without limitation, HDMI. Portable computing device 214 may perform the following functions, in real time: connects to and captures the streamed audio-video data from the filming device 212; sends the audio-video data through the communication network channel 230; receives and displays control information from client 205; and has an electronic compass. Portable computing device 214 may include a dedicated program installed, so that it may perform the above mentioned tasks.

In the present embodiment, client devices 205 may include a computing device 206, a display device 207, and a control device 208. Computing device 206 may include a portable computing device or a desktop computing device. In an alternate embodiment, computing device 206 may be included in a smart television. Display device 207 may be any display means for presenting the video stream from operator device 210 received by client device 205. Control device 208 may be connected to computing device 206, which may allow the client to input the desired commands regarding how the filming should continue such as, without limitation, parameters controlling the way the filming may be performed, such as, without limitation, shooting direction, camera tilt, zoom, a desired advancing speed, how to turn or when to stop, etc. Control device 208 may be a device such as, without limitation, a pointing device, a joystick, a tracking ball, a keyboard, a touch panel, a remote control, or a method for tracking eyes movements.

In the present embodiment, relay 215 may include a server 217 that may be connected to communication network channels 225 and 230. Relay 215 may be configured for: providing a bi-directional communication, in real time, between client device 205 and operator device 210 for example, without limitation, forwarding filming control information, chat messages, other data sent by the client to the operator, and sending audio-video data, chat messages and other data sent by the operator to the client; simultaneously connecting to a number of clients and making possible that each client may connect to the operators of their choice; connecting simultaneously to a number of operators; allowing a client to connect in the same time to more operators, each positioned and filming different locations, so that the client may choose what location to view, from the available ones. In an alternate embodiment, the client may choose to connect to more than one operator at the same location to provide multiple points of view to the location.

In the present embodiment communication network channels 225 and 230 may be, without limitation, the Internet or other private dedicated networks. The physical wireless connection to the network may be made through means such as, but not limited to, mobile networks, Wi-Fi or satellite channels.

In an exemplary operation of the system the operator films the location remote from the client with the filming device 212. This device may stream the audio-video data to portable computing device 214 which may set a wireless connection with the communication network channel 230 and may send the said audio-visual data through relay 215, to the client device 205. In client device 205, computing device 206 receives the audio-video data from operator device 210, through relay 215 and through the network channel 225 and displays it in real time on display device 207 to which it is connected with, so that the client may see it. Control device 208 connected to computing device 206 may allow the client to input filming control commands regarding how filming should continue next, by modifying parameters such as, but not limited to, shooting direction, camera tilt, zoom, as well as sending operator chat messages or the desired advancing speed, how to turn or when to stop. Computing device 206 sends this filming control information through the communication network channel 225 and through relay 215 to operator device 210 and in the same time it displays this control information on a part of the display device 207, so that the client can check his/her own control actions. The control information may be received and displayed on a display screen of portable computing device 214. As the operator complies and filming is continued in accordance with the client's requirements, the video information sent back to the client becomes proper. The client may confirm the accuracy of filming, which may close the negative feedback loop. Thus, by means of this negative feedback loop, this system may allow the client to view the remote places such as, but not limited, to tourist spots filmed by the operator, in real time, and shot in a manner directly controlled by himself/herself, conferring client a "virtual trip" experience.

Figure 3:
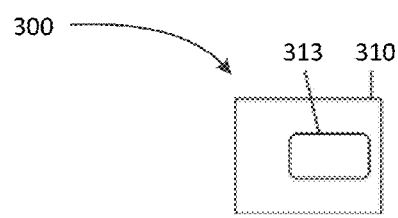
FIG. 3 illustrates an exemplary operator device, in accordance with an embodiment of the present invention.

FIG. 3 illustrates an exemplary operator device, in accordance with an embodiment of the present invention. An operator device 310 may include a filming device 313. In the present embodiment, filming device 313 may include an embedded portable computing and display device in accordance with the teaching herein.

Figure 4:
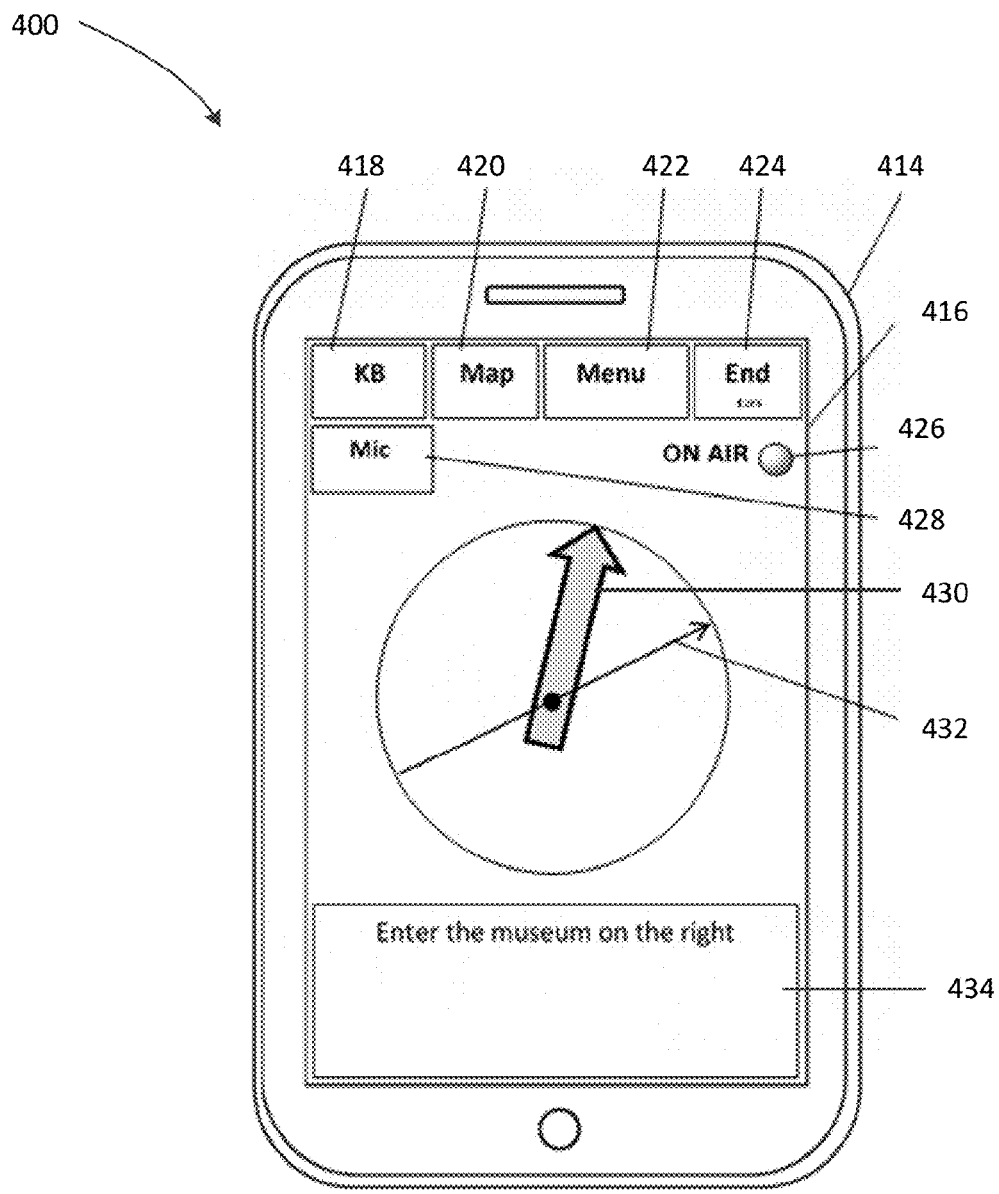
FIG. 4 illustrates an exemplary display for an operator device, in accordance with an embodiment of the present invention.

FIG. 4 illustrates an exemplary display for an operator device, in accordance with an embodiment of the present invention. Portable computing device 414 may include a display screen 416. Display screen 416 may display a keyboard button 418, a map view button 420, a menu button 422, a close program button 424, a transmission button 426, a microphone button 428, a filming direction indicator 430, a compass indicator 432, and a chat window 434. Activation of displayed buttons may typically be accomplished by, without limitation, touch with finger or stylus. Keyboard button 418 may show/hide a keyboard display (not shown) for entering text into chat window 434. Map view button 420 may show/hide a map of the location of portable computing device 414. In some embodiments, map information may be obtained using a network connection. In alternate embodiments, the map information may be stored locally on portable computing device 414. Menu button 422 may display a list of available functions such as, but not limited to, toggle audio sending on/off for video only mode, setting the video resolution in case communication network channel 230 is not fast enough, the video resolution of the filming can be lowered, toggle color/black-white mode, pause/resume function, etc. Close button 424 may exit the running program. Transmission button 426 may start/stop transmission of the audio video stream. Microphone button 428 may turn a microphone of portable computing device 414 on or off. Filming direction indicator 430 shows the direction the filming device 212 may be pointed. Compass indicator 432 points to magnetic north. Chat window 434 may display text during a chat session. In some embodiments, the operator may engage in text messaging with the client. In some other embodiments, the operator may engage in text messaging with an operator of relay device 215. In some other embodiments, the operator may engage in voice messaging.

Figure 5:
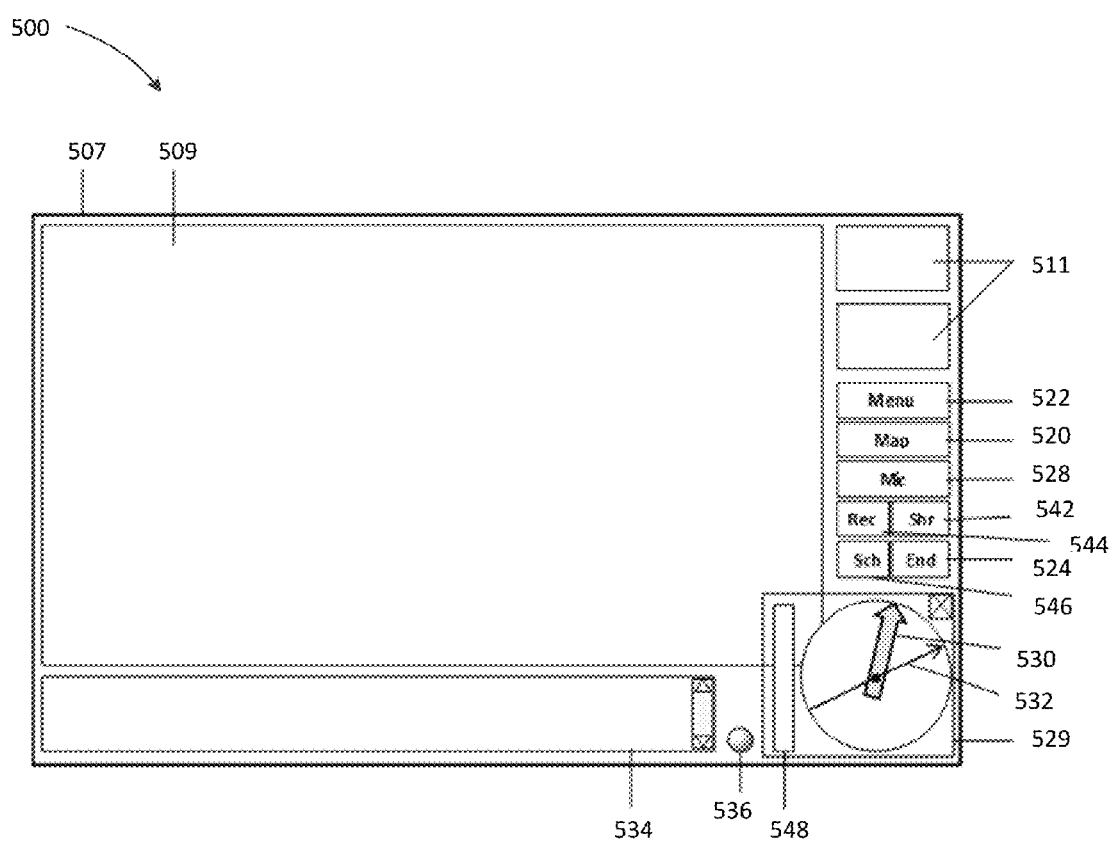
FIG. 5 illustrates an exemplary display for a client device, in accordance with an embodiment of the present invention.

FIG. 5 illustrates an exemplary display for a client device, in accordance with an embodiment of the present invention. A display for a client device 500 may include a display screen 507, a main display area 509, thumbnail displays 511, a map view button 520, a menu button 522, an end button 524, a microphone button 528, a filming control panel 529, a filming direction indicator 530, a compass indicator 532, a chat window 534, an operator's state check button 536, a share button 542, a record button 544, a schedule button 546, and a filming commands display 548. Main display area 509 displays the streamed video. Thumbnail displays 511 the filmings from operators available at a certain moment so that they can be chosen from. Map view button 520 may show/hide a map of the location of portable computing device 414. In some embodiments, map information may be obtained using a network connection. In alternate embodiments, the map information may be stored locally on the client computing device. Settings or Menu button 522 may display a list of available functions such as, but not limited to, setting the IP of the streaming server, choose the file location for when recording the live streaming, set the IP of other computers that user wants to share the streaming data with. End button 524 may exit the running program. Microphone button 528 may turn a microphone of client computing device 205 on or off. Filming direction indicator 530 shows the direction the filming device 212 may be pointed. Compass indicator 532 points to magnetic north. Chat window 534 may display text during a chat session. In some embodiments, the client may engage in text messaging with the operator. In some other embodiments, the client may engage in text messaging with an operator of relay device 215. In some other embodiments, the client may engage in voice messaging. Operator's state check button 536 may be activated to show if the selected client device is offline, in standby, or streaming. Share button 542 may allow the client to send the audio-video information to a different computer connected to itself so that a third party can watch the respective audio-video information on their own display, in the same time. The settings regarding the other computer connection credentials, such as, but not limited to, IP address, can be registered through the program, for example, without limitation, using menu button 522. Record button 544, may allow recording of the audio-video data on a local mass-storage device, in a predetermined format/codec. In an alternate embodiment, record button 544 may instruct relay device 215 to record the audio-video data on server 217. Schedule button 546 may allow scheduling of the next live connection with operators. Filming commands display 548 may display filming control commands inputted from control device 208 such as, but not limited to, tilt, zoom, operator's advancing speed, etc.

FIGS. 6 A-C illustrate operation of an exemplary negative feedback, in accordance with an embodiment of the present invention. In the present embodiment an axis 650 is a longitudinal axis of portable computing device 214 which is generally parallel to a longitudinal axis of filming device 212. Compass indicator 632 points to magnetic north. A filming direction 630 may rotate as the client manipulates control device 208 and the respective information is received in real time. An angle 652 is an angle made between axis 650 and the North direction 632, which may be used as a reference direction on portable computing device 214 and may be given by its electronic compass. A program executing on portable computing device 214 may able to keep track of angle 652. The North direction may be sent to client's computing device 210 for display as compass indicator 532. Angle 654 is the current angle made between axis 650 and indicator of filming direction 630 which points the direction that the client wants shooting to be performed next, AS shown in FIG. 6B. When there is no command from the client, the default position of filming direction 630 may be upright and angle 654 is 0, as shown in FIG. 6A. When The client requests changing the shooting direction with a desired angle, computing device 206 may send the respective information to portable computing device 214, which may display it as angle 654, as shown in FIG. 6B. In order to comply with the request, the operator turns to shoot in the direction pointed by filming direction 630, so axis 650 rotates toward that direction, as shown in FIG. 6C, and so angle 652 modifies. In the present embodiment, filming direction 630 may be kept unchanged, relative to the reference North direction 632 during axis 650 rotation, and to achieve that, the program re-calculates in real time the angle 654, as shown in FIG. 6C it decreases angle 654 with the same amount that angle 652 is increased. Portable computing device 214 may send continuously, at small enough time intervals, this angle information back to the client's computing device 206. Thus, the angle between the indicator of filming direction 530 on display for the client device 500 and the vertical side of the screen is the same as angle 654, and it changes following the operator's rotation, ensuring that the two filming direction indicators 630 and 530 are essentially parallel, that is, the two arrows keep the same angle with the axis 650 and with the vertical side of client device 500, respectively. When the operator's position becomes so that angle 654 is essentially zero, the result of client's command may be completed allowing him/her to view the filmed scenes as desired, which concludes the negative feedback loop. Although the most important filming control command may be direction, there may be other control parameters that can be sent by the client, such as tilt, but not limited to, zoom, as well as operator's moving speed or direction, or stop. These may be similarly indicated through predetermined visually graphic indicators, such as, but not limited to, shapes which change size, or color, as well as by text or voice or particular sounds. Similarly, to the direction loop, in all such cases when a command parameter is sent from the client, as the operator may continue filming in a manner complying with these instructions, the negative feedback loop works so that the respective parameters change in a way that makes the filming performed in accordance with client's desire. Visual graphic changing parameters commanded by the client are also displayed on client's display device 207, so that he/she can see their own commands, too. In a non-limiting example, panning command may be indicated through a changing angel of a circle, between a reference axis such as, without limitation, the vertical direction and the desired direction axis. Tilting may also be indicated similarly through an angle between a reference axis such as, without limitation, horizontal direction and the desired direction axis. Zooming as well as a command for changing the advancing speed may be indicated through either a shape such as, without limitation, a line or a bar or a rectangle changing its length or through a color range. Sound effects with predefined meanings may be optionally added. Commanding by text messages or voice may be another option.

FIG. 7 illustrates exemplary routines of dedicated programs, in accordance with an embodiment of the present invention. In the present embodiment, client computing device 206, relay server 217, and operator portable computing device 214 may have dedicated programs for enabling the teachings of the present invention. In the present embodiment, a dedicated program 705 installed on client computing device 206 may, in real time, connect to the communication network channel 225, and through this network connect to operator's portable computing device 214. In a process step 707, program 705 may receive the stream of audio-video data from portable computing device 214, decode it as necessary by means such as, but not limited to, codecs and display it on a display device 207. In a process step 709, program 705 may capture commands from the control device 208 and send them in a predefined manner through network channel 225 to operator's portable computing device 214.

In the present embodiment, the dedicated program 710 installed on portable computing device 214 may, in real time, recognize the filming device 212 and receive from this the audio-video data input. Program 710 may connect to the communication network channel 230. In a non-limiting example, as the IP of relay 215 may be known, it may be able to connect to relay server program 715 through a commonly agreed protocol and be able to send and receive data to and from relay 215. During capturing of audio-video data from filming device 212, program 710 may encode or compress the audio-video data before sending it, by means such as, but not limited to, codecs in a process step 714. In a process step 716, program 710 may send the data through communication network channel 230, to relay server 217, live, using streaming protocols such as, but not limited to RTSP, RTMP, MMS, HTTP, RTP, and UDP. In a process step 712, program 710 may display, in a predetermined manner, the instructions sent by the client, and received through server 217, about how filming should be continued next.

In other embodiments, program 710 may additionally compress the streamed data with an audio-video codec before sending it further, so that it may save bandwidth and/or gain speed. In other embodiments, program 710 may additionally encrypt audio-video data, for security reasons. In some other embodiments, program 710 may additionally, if GPS function is available, display the map at the current location by feeding the current coordinates to a map service provided by third parties. The map view on display 416 may be toggled on/off with map view button 420. The map coordinates may also be sent at determined time intervals to the client computing device 206, so that the client can see the map too, on his display device 207. In other embodiments, program 710 may additionally enable the chat function for text and voice messaging.

In the present embodiment, the dedicated program 715 installed on relay server 217 may receive the audio-video data as well as positioning information from portable computing devices 214 and forward it to the corresponding client computing devices 206 in a process step 719. In a process step 717 the program 715 receives filming control information such as, but not limited to, shooting direction, tilt, zoom, advancing speed, etc. from client computing device 206 and forwards it to the corresponding operator portable computing devices 214.

In other embodiments, program 715 may additionally provide and maintain the functionality of the system as a service, offered to clients. In other embodiments, program 715 may maintain a database on server 217, storing all clients' and operators' information and allow secure login for all parties, before matching each client with the proper operator and the effective start of service. In other embodiments, program 715 may, while relaying the audio-video data received from the operator to the client, the media server program can in the same time make possible recording the data, on a mass storage device. In some other embodiments, program 715 may toggle data encryption on/off. In some other embodiments, program 715 may insert subtitles with explanations about the scenes filmed by and received from the operator, during relaying the respective data to the client. In other embodiments, program 715 may provide translation for the chat communication (written or voice) between the client and the operator (in such cases when these do not share a common language), or other necessary translations (related to on-site situations), during relaying the respective data to the client. In some embodiments, program 715 may add optional audio or video editing in real time such as, but not limited to, cut audio or video noise, sharpen/blur video, add/lessen contrast, add/lessen color saturation, etc.

In alternative embodiments, if the filming device 212, has the capability of compressing and/or encoding the data stream, then portable computing device 214 may not have to perform these tasks. In another alternative embodiment, filming device 212 may have an embedded a vertical tilt sensor. In this embodiment, client's controlling of the vertical tilt may be done in a similar way with the direction control, already described, that is filming device 212 becomes capable of sending in real time the tilt information (the angle formed by said filming device's axis and the horizontal plane), back to the client computing device 206.

In other alternate embodiments, filming device 212 may embed all the necessary functions performed by portable computing device 214, as described above. Thus, the two devices merge into one single device 313, which suffices to perform all the tasks, see FIG. 3. In this embodiment, it may be easier to ensure that axis 650 and the filming device 212 longitudinal axis are kept parallel.

In yet some other alternate embodiments, filming device 212 may be attached to a remotely controlled vehicle such as, but not limited to, a Segway type device or a drone where the operator may control the vehicle according to the client's instructions.

In still another alternate embodiment, the operator may provide a running commentary during the video where the commentary may be on a sub-audio channel selectable by the client.

In other embodiments, teachings of the present invention may be applied to medical applications. In a non-limiting example, doctors may check on patients with diseases such as, without limitation, nervous system diseases where the doctor may command the patient from distance what to do and see if they respond properly. In other embodiments, teachings of the present invention may be applied in the lab work and the field work. In a non-limiting example, people working in a dedicated place such as, without limitation, a laboratory may command other operators which are in the field and feedback visual data, if it is difficult to go there by themselves. This may include, without limitation, situations when the work in the field is dangerous for unprepared people.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 8:
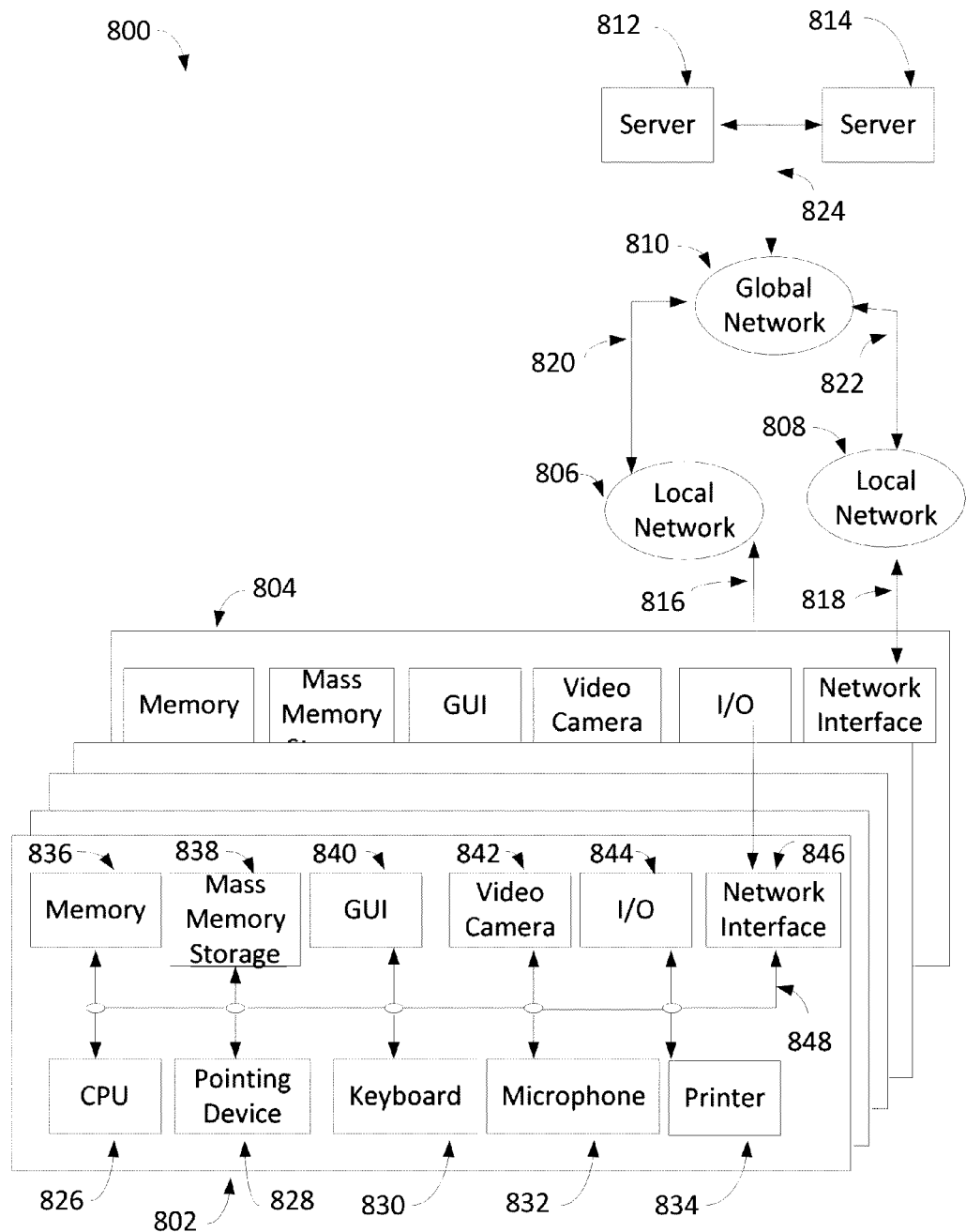
FIG. 8 is a block diagram depicting an exemplary client/server system which may be used by an exemplary web-enabled/networked embodiment of the present invention.

FIG. 8 is a block diagram depicting an exemplary client/server system which may be used by an exemplary web-enabled/networked embodiment of the present invention.

A communication system 800 includes a multiplicity of clients with a sampling of clients denoted as a client 802 and a client 804, a multiplicity of local networks with a sampling of networks denoted as a local network 806 and a local network 808, a global network 810 and a multiplicity of servers with a sampling of servers denoted as a server 812 and a server 814.

Client 802 may communicate bi-directionally with local network 806 via a communication channel 816. Client 804 may communicate bi-directionally with local network 808 via a communication channel 818. Local network 806 may communicate bi-directionally with global network 810 via a communication channel 820. Local network 808 may communicate bi-directionally with global network 810 via a communication channel 822. Global network 810 may communicate bi-directionally with server 812 and server 814 via a communication channel 824. Server 812 and server 814 may communicate bi-directionally with each other via communication channel 824. Furthermore, clients 802, 804, local networks 806, 808, global network 810 and servers 812, 814 may each communicate bi-directionally with each other.

In one embodiment, global network 810 may operate as the Internet. It will be understood by those skilled in the art that communication system 800 may take many different forms. Non-limiting examples of forms for communication system 800 include local area networks (LANs), wide area networks (WANs), internet service providers (ISPs), network access points (NAPs), wired telephone networks, wireless networks, or any other network supporting data communication between respective entities.

Clients 802 and 804 may take many different forms. Non-limiting examples of clients 802 and 804 include personal computers, personal digital assistants (PDAs), cellular phones and smartphones.

Client 802 includes a CPU 826, a pointing device 828, a keyboard 830, a microphone 832, a printer 834, a memory 836, a mass memory storage 838, a GUI 840, a video camera 842, an input/output interface 844 and a network interface 846.

CPU 826, pointing device 828, keyboard 830, microphone 832, printer 834, memory 836, mass memory storage 838, GUI 840, video camera 842, input/output interface 844 and network interface 846 may communicate in a unidirectional manner or a bi-directional manner with each other via a communication channel 848.

Communication channel 848 may be configured as a single communication channel or a multiplicity of communication channels.

CPU 826 may be comprised of a single processor or multiple processors. CPU 826 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 836 is used typically to transfer data and instructions to CPU 826 in a bi-directional manner. Memory 836, as discussed previously, may include any suitable computer-readable media, intended for data storage, such as those described above excluding any wired or wireless transmissions unless specifically noted. Mass memory storage 838 may also be coupled bi-directionally to CPU 826 and provides additional data storage capacity and may include any of the computer-readable media described above. Mass memory storage 838 may be used to store programs, data and the like and is typically a secondary storage medium such as a hard disk. It will be appreciated that the information retained within mass memory storage 838, may, in appropriate cases, be incorporated in standard fashion as part of memory 836 as virtual memory.

CPU 826 may be coupled to GUI 840. GUI 840 enables a user to view the operation of computer operating system and software. CPU 826 may be coupled to pointing device 828. Non-limiting examples of pointing device 828 include computer mouse, trackball and touchpad. Pointing device 828 enables a user with the capability to maneuver a computer cursor about the viewing area of GUI 840 and select areas or features in the viewing area of GUI 840. CPU 826 may be coupled to keyboard 830. Keyboard 830 enables a user with the capability to input alphanumeric textual information to CPU 826. CPU 826 may be coupled to microphone 832. Microphone 832 enables audio produced by a user to be recorded, processed and communicated by CPU 826. CPU 826 may be connected to printer 834. Printer 834 enables a user with the capability to print information to a sheet of paper. CPU 826 may be connected to video camera 842. Video camera 842 enables video produced or captured by user to be recorded, processed and communicated by CPU 826.

CPU 826 may also be coupled to input/output interface 844 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 826 optionally may be coupled to network interface 846 which enables communication with an external device such as a database or a computer or telecommunications or internet network using an external connection shown generally as communication channel 816, which may be implemented as a hardwired or wireless communications link using suitable conventional technologies. With such a connection, CPU 826 might receive information from the network, or might output information to a network in the course of performing the method steps described in the teachings of the present invention.

Figure 9:
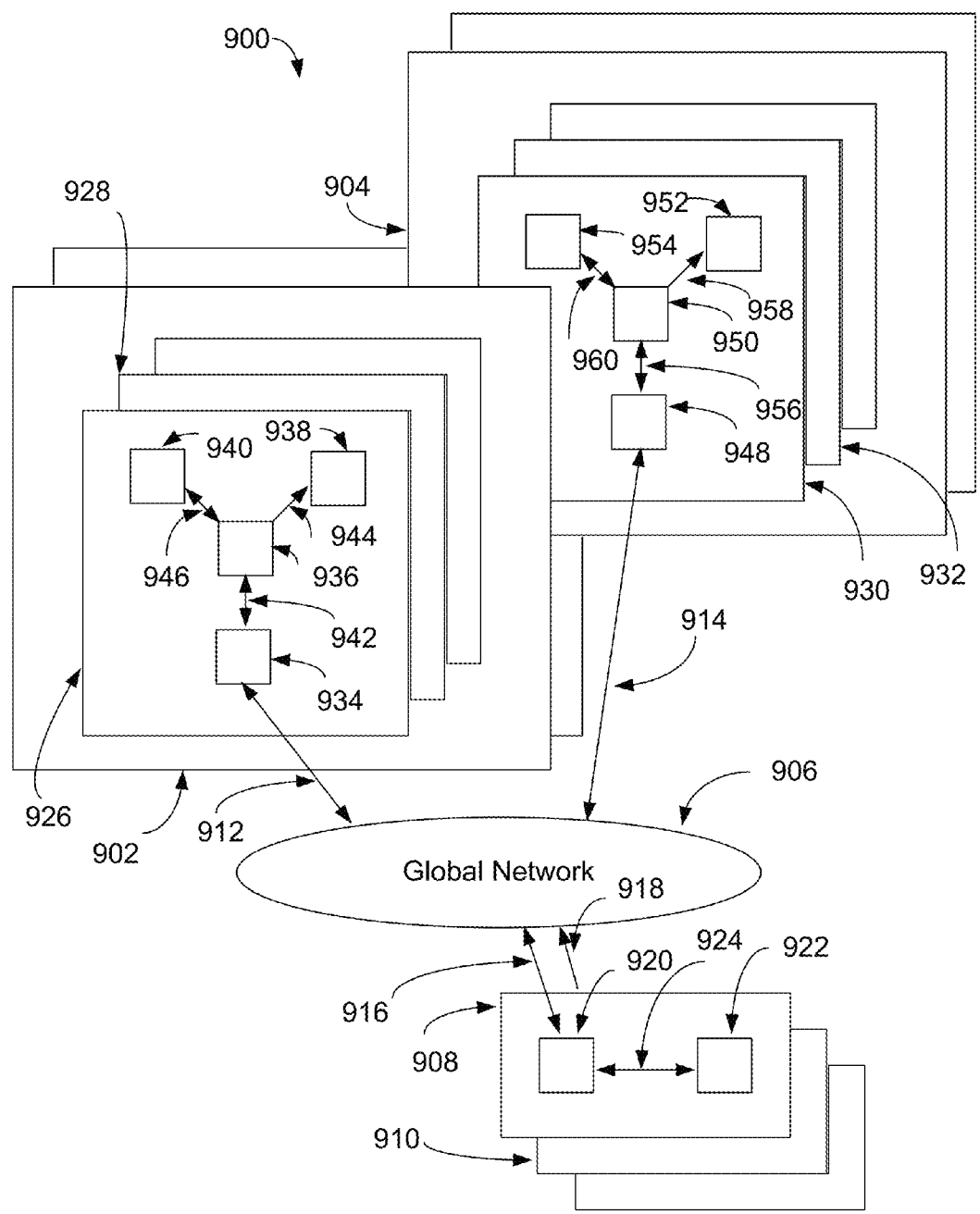
FIG. 9 illustrates a block diagram depicting a conventional client/server communication system.

FIG. 9 illustrates a block diagram depicting a conventional client/server communication system.

A communication system 900 includes a multiplicity of networked regions with a sampling of regions denoted as a network region 902 and a network region 904, a global network 906 and a multiplicity of servers with a sampling of servers denoted as a server device 908 and a server device 910.

Network region 902 and network region 904 may operate to represent a network contained within a geographical area or region. Non-limiting examples of representations for the geographical areas for the networked regions may include postal zip codes, telephone area codes, states, counties, cities and countries. Elements within network region 902 and 904 may operate to communicate with external elements within other networked regions or within elements contained within the same network region.

In some implementations, global network 906 may operate as the Internet. It will be understood by those skilled in the art that communication system 900 may take many different forms. Non-limiting examples of forms for communication system 900 include local area networks (LANs), wide area networks (WANs), wired telephone networks, cellular telephone networks or any other network supporting data communication between respective entities via hardwired or wireless communication networks. Global network 906 may operate to transfer information between the various networked elements.

Server device 908 and server device 910 may operate to execute software instructions, store information, support database operations and communicate with other networked elements. Non-limiting examples of software and scripting languages which may be executed on server device 908 and server device 910 include C, C++, C# and Java.

Network region 902 may operate to communicate bi-directionally with global network 906 via a communication channel 912. Network region 904 may operate to communicate bi-directionally with global network 906 via a communication channel 914. Server device 908 may operate to communicate bi-directionally with global network 906 via a communication channel 916. Server device 910 may operate to communicate bi-directionally with global network 906 via a communication channel 918. Network region 902 and 904, global network 906 and server devices 908 and 910 may operate to communicate with each other and with every other networked device located within communication system 900.

Server device 908 includes a networking device 920 and a server 922. Networking device 920 may operate to communicate bi-directionally with global network 906 via communication channel 916 and with server 922 via a communication channel 924. Server 922 may operate to execute software instructions and store information.

Network region 902 includes a multiplicity of clients with a sampling denoted as a client 926 and a client 928. Client 926 includes a networking device 934, a processor 936, a GUI 938 and an interface device 940. Non-limiting examples of devices for GUI 938 include monitors, televisions, cellular telephones, smartphones and PDAs (Personal Digital Assistants). Non-limiting examples of interface device 940 include pointing device, mouse, trackball, scanner and printer. Networking device 934 may communicate bi-directionally with global network 906 via communication channel 912 and with processor 936 via a communication channel 942. GUI 938 may receive information from processor 936 via a communication channel 944 for presentation to a user for viewing. Interface device 940 may operate to send control information to processor 936 and to receive information from processor 936 via a communication channel 946. Network region 904 includes a multiplicity of clients with a sampling denoted as a client 930 and a client 932. Client 930 includes a networking device 948, a processor 950, a GUI 952 and an interface device 954. Non-limiting examples of devices for GUI 938 include monitors, televisions, cellular telephones, smartphones and PDAs (Personal Digital Assistants). Non-limiting examples of interface device 940 include pointing devices, mousse, trackballs, scanners and printers. Networking device 948 may communicate bi-directionally with global network 906 via communication channel 914 and with processor 950 via a communication channel 956. GUI 952 may receive information from processor 950 via a communication channel 958 for presentation to a user for viewing. Interface device 954 may operate to send control information to processor 950 and to receive information from processor 950 via a communication channel 960.

For example, consider the case where a user interfacing with client 926 may want to execute a networked application. A user may enter the IP (Internet Protocol) address for the networked application using interface device 940. The IP address information may be communicated to processor 936 via communication channel 946. Processor 936 may then communicate the IP address information to networking device 934 via communication channel 942. Networking device 934 may then communicate the IP address information to global network 906 via communication channel 912. Global network 906 may then communicate the IP address information to networking device 920 of server device 908 via communication channel 916. Networking device 920 may then communicate the IP address information to server 922 via communication channel 924. Server 922 may receive the IP address information and after processing the IP address information may communicate return information to networking device 920 via communication channel 924. Networking device 920 may communicate the return information to global network 906 via communication channel 916. Global network 906 may communicate the return information to networking device 934 via communication channel 912. Networking device 934 may communicate the return information to processor 936 via communication channel 942. Processor 996 may communicate the return information to GUI 998 via communication channel 944. User may then view the return information on GUI 938.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: any internet or network access point; repeaters; hubs; satellites and other means that help sending data at a further distance; and internet service providers (ISPs) or mobile network service providers.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breathe life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a real time filming of a remote location according to the present invention will be apparent to those skilled in the art. Various aspects of the invention have been described above by way of illustration, and the specific embodiments disclosed are not intended to limit the invention to the particular forms disclosed. The particular implementation of the real time filming of a remote location may vary depending upon the particular context or application. By way of example, and not limitation, the real time filming of a remote location described in the foregoing were principally directed to a client providing instructions to an operator for filming implementations; however, similar techniques may instead be applied to controlling a remote filming device without an operator, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
    establishing, with client device, a real time bi-directional communication channel with a remote filming system via a relay device, wherein a server of said relay device is configured to forward at least a filming control information to a portable computing device of said remote filming system and send at least one of an audio data and a video data to a computing device of said client device;
    inputting, on a control device connected to said client computing device, said filming control information;
    communicating, with said client computing device, said filming control information via said relay device, in which said filming control information comprising at least one command to said remote filming system, wherein said relay device server is configured to capture said filming control information from said client control device and send said filming control information to said portable computing device, the command at least comprising an instructions for conducting a remote filming, wherein said remote filming instructions is displayable on said remote filming system;
    receiving, with said client computing device, at least a current position data of said remote filming system and a real time stream of said remote filming via said relay device, wherein said relay device server is configured to receive said current position data and real time stream from said remote filming system and forward to said client computing device;
    displaying, with a display screen of said client device, said current position and real time stream of said remote filming, in which said real time stream comprising at least and an audio and video data of said remote filming; and
    communicating at least an additional command to said remote filming system, wherein said additional command comprise a negative feedback loop during said remote filming.

2. The method as recited in claim 1, further comprising engaging, with a chat window of said client device, a text or voice messaging with said remote filming system.

3. The method as recited in claim 1, in which said communicating of said additional command comprises communicating a directional indicator configured to change a filming direction of said remote filming system, wherein said directional indicator is displayed on a display screen of said filming system relative to a compass indicator.

4. The method as recited in claim 3, in which said directional indicator comprise a predetermined angle between said compass indicator as a reference point and an axis of said directional indicator.

5. The method as recited in claim 1, in which said additional commands further comprise a predetermined rate of an advancing speed of said remote filming system.

6. The method as recited in claim 1, in which said additional commands further comprise a predetermined tilt of said remote filming system.

7. The method as recited in claim 4, further comprising receiving a change of said filming direction of said remote filming system via said relay device.

8. The method as recited in claim 7, further comprising displaying said change of said filming direction of said remote filming system, in which said change of filming direction is displayed relative to a magnetic north indicator and a filming direction indicator of said client device.

9. The method as recited in claim 1, further comprising instructing said relay device to record said audio and video data on said relay device server, in which said instructing comprises activating a record button of said client device.

10. The method as recited in claim 8, further comprising concluding said negative feedback loop when an angle between said magnetic north indicator and said filming direction indicator of said client device is approximately less than a predetermined angle.

11. The method as recited in claim 1, in which said relay device server is further operable for processing and storing the streaming of remote filming before relaying said at least a filming control information to said portable computing device of said remote filming system and said at least one of an audio data and a video data to said client computing device.

12. A method comprising:
    steps for establishing, with client device, a bi-directional communication channel with a filming system, via a relay device, wherein a server of said relay device is configured to forward at least a filming control information to a portable computing device of said remote filming system and send at least one of an audio data and a video data to a computing device of said client device;
    inputting, on a control device connected to said client computing device, said filming control information;
    steps for communicating, with said client computing device, said filming control information, in which said filming control information comprising instructions for conducting a filming via said relay device, wherein said relay device server is configured to capture said filming control information from said client control device and send said filming control information to said portable computing device;

steps for receiving, with said client computing device, at least a current position data of said filming system and an audio and video data of said filming via said relay device;

steps for communicating a directional indicator configured to change a filming direction of said filming system, wherein said directional indicator is displayed on a display screen of said filming system relative to a compass indicator as part of a negative feedback loop during the filming; and concluding said negative feedback loop when an angle between a magnetic north indicator and a filming direction indicator of said client device is approximately less than a predetermined angle.

13. The method as recited in claim 12, further comprising steps for engaging a messaging with said filming system.

14. A non-transitory computer-readable storage medium with an executable program stored thereon, wherein the program instructs one or more processors to perform the following steps:

establishing, with client device, a bi-directional communication channel with a filming system via a relay device, wherein a server of said relay device is configured to forward at least a filming control information to a portable computing device of said remote filming system and send at least one of an audio data and a video data to a computing device of said client device;

communicating at least one command to said filming system, the command at least comprising instructions for conducting a filming, wherein the instructions are displayable on said filming system;

receiving at least a real time stream of the filming via said relay device, wherein said real time stream comprising at least an audio and video data of said filming;

displaying, with a display screen of said client device, said audio and video data of said remote filming;

communicating at least an additional command to said filming system during said receiving, wherein said additional command comprise a negative feedback loop during said filming.

15. The program instructing the one or more processors as recited in claim 14, further comprising engaging a messaging with said filming system.

16. The program instructing the one or more processors as recited in claim 14, in which said additional command comprising a directional indicator of said filming system.

17. The program instructing the one or more processors as recited in claim 16, in which said additional commands further comprise a predetermined angle relative to the directional indicator.

18. The program instructing the one or more processors as recited in claim 14, in which said additional commands further comprise a predetermined rate of an advancing speed of said filming system.

19. The program instructing the one or more processors as recited in claim 14, in which said additional commands further comprise a desired tilt of said filming system.

20. The program instructing the one or more processors as recited in claim 17, in which said directional indicator comprises a magnetic north indicator of a location of said filming system and a pointing indicator of said filming system.

21. The program instructing the one or more processors as recited in claim 20, further displaying, on a display screen of said client device, said predetermined angle relative to a magnetic north indicator and a pointing indicator of said client device display screen.

22. The program instructing the one or more processors as recited in claim 14, further concluding said negative feedback loop when an angle between a magnetic north indicator and a filming direction indicator of said client device is approximately less than a predetermined angle.

* * * * *